United States Patent
Bathen et al.

(10) Patent No.: US 10,887,389 B2
(45) Date of Patent: *Jan. 5, 2021

(54) DECENTRALIZED IMMUTABLE STORAGE BLOCKCHAIN CONFIGURATION

(71) Applicant: International Business Machines Corporation, Armonk, NY (US)

(72) Inventors: Luis Angel D. Bathen, Placentia, CA (US); Gabor Madl, San Jose, CA (US); Ramani R. Routray, San Jose, CA (US); Mu Qiao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,212

(22) Filed: Jan. 2, 2020

(65) Prior Publication Data

US 2020/0145487 A1    May 7, 2020

Related U.S. Application Data

(63) Continuation of application No. 15/350,793, filed on Nov. 14, 2016, now Pat. No. 10,554,746.

(51) Int. Cl.
*H04L 29/08* (2006.01)
*H04L 9/32* (2006.01)

(52) U.S. Cl.
CPC ........ *H04L 67/1095* (2013.01); *H04L 9/3236* (2013.01); *H04L 9/3247* (2013.01); *G06Q 2220/00* (2013.01); *H04L 2209/38* (2013.01); *H04L 2209/56* (2013.01)

(58) Field of Classification Search
CPC ............. H04L 67/1095; H04L 67/1097; H04L 9/3236; H04L 9/3247; H04L 2209/38; H04L 2209/56; G06Q 2220/00
See application file for complete search history.

(56) References Cited

U.S. PATENT DOCUMENTS

| | | | |
|---|---|---|---|
| 8,055,622 B1 | 11/2011 | Botes et al. | |
| 8,335,889 B2 | 12/2012 | Ungureanu et al. | |
| 8,615,489 B2 | 12/2013 | Pershin et al. | |
| 9,158,783 B2 | 10/2015 | Chhaunker et al. | |
| 10,340,038 B2 * | 7/2019 | Witchey ................. | G06Q 10/10 |
| 2012/0185437 A1 | 7/2012 | Pavlov et al. | |
| 2015/0134709 A1 | 5/2015 | Lee et al. | |
| 2015/0186437 A1 | 7/2015 | Molaro | |
| 2015/0237121 A1 | 8/2015 | Nigam et al. | |

(Continued)

OTHER PUBLICATIONS

List of IBM Patents or Patent Applications Treated as Related, Feb. 6, 2020.

(Continued)

*Primary Examiner* — Todd L Barker

(57) ABSTRACT

A virtual blockchain configuration may provide a distributed structure that uses a distributed hash configuration to reduce the complexity of blockchain transactions. One example method of operation may comprise one or more of storing a subset of blockchain data in a network device, accessing via the network device a virtual copy of a blockchain, accessing a blockchain block via the virtual copy of the blockchain, and writing blockchain transactions to the blockchain block via the network device.

17 Claims, 5 Drawing Sheets

(56) References Cited

U.S. PATENT DOCUMENTS

| | | |
|---|---|---|
| 2015/0254272 A1 | 9/2015 | Regni et al. |
| 2015/0379510 A1 | 12/2015 | Smith |
| 2016/0012155 A1 | 1/2016 | Shivarudraiah et al. |
| 2016/0028552 A1 | 1/2016 | Spanos et al. |
| 2016/0092988 A1 | 3/2016 | Letourneau |
| 2016/0098723 A1 | 4/2016 | Feeney |
| 2016/0198501 A1 | 7/2016 | Verkaik et al. |
| 2017/0236123 A1 | 8/2017 | Ali et al. |
| 2017/0326123 A1 | 11/2017 | Shanley |

OTHER PUBLICATIONS

Bathen et al., "Decentralized Immutable Storage Blockchain Configuration", U.S. Appl. No. 15/1350,793, filed Nov. 14, 2016.

Bruce, "The Mini-Blockchain Scheme" Jul. 2014, www.cryptonite.info.

Frey et al., "Bringing secure Bitconin transactions to your smartphone", Nov. 3, 2016, hAL [Id: hal-01384461].

Fujimura et al.; "BRIGHT: A Concept for a Decentralized Rights Management System Based on Blockchain".

ip.com et al.; "Controlled Storage Management for Critical Data in the Enterprise Cloud Environment".

Trent et al.; BigChainDB: A Scalable Blockchain Database.

\* cited by examiner

300

DECENTRALIZED IMMUTABLE STORAGE BLOCKCHAIN CONFIGURATION

TECHNICAL FIELD

This application relates to storage configurations and more specifically to immutable storage on a blockchain.

BACKGROUND

In a blockchain configuration, most blockchain related efforts focus on various usage efforts related to blockchain technology rather than optimizing current blockchain infrastructure. As a result, reports have shown that the blockchain approaches do not scale well and have certain limitations (e.g., performance, storage, etc.). For instance, current network processes provide 3-20 transactions per second. Blockchain technologies suffer from certain limitations, such as each node in the network having a full copy of the blockchain, high redundancy rates, fully decentralized structure, high storage requirements, synchronization issues, storage requirements as the number of blockchain participants increase, etc. An optimal blockchain infrastructure may include other approaches to making the network more efficient and accessible.

SUMMARY

One example embodiment may include a method that comprises one or more of storing a subset of blockchain data in a network device, accessing via the network device a virtual copy of a blockchain, accessing a blockchain block via the virtual copy of the blockchain, and writing blockchain transactions to the blockchain block via the network device.

Another example embodiment may include an apparatus that comprises one or more of a memory configured to store a subset of blockchain data, and a processor configured to access via the network device a virtual copy of a blockchain, access a blockchain block via the virtual copy of the blockchain, and write blockchain transactions to the blockchain block.

Yet another example embodiment may include a non-transitory computer readable storage medium configured to store instructions that when executed causes a processor to perform one or more of storing a subset of blockchain data in a network device, accessing via the network device a virtual copy of a blockchain, accessing a blockchain block via the virtual copy of the blockchain, and writing blockchain transactions to the blockchain block via the network device.

DETAILED DESCRIPTION

Figure 1A:
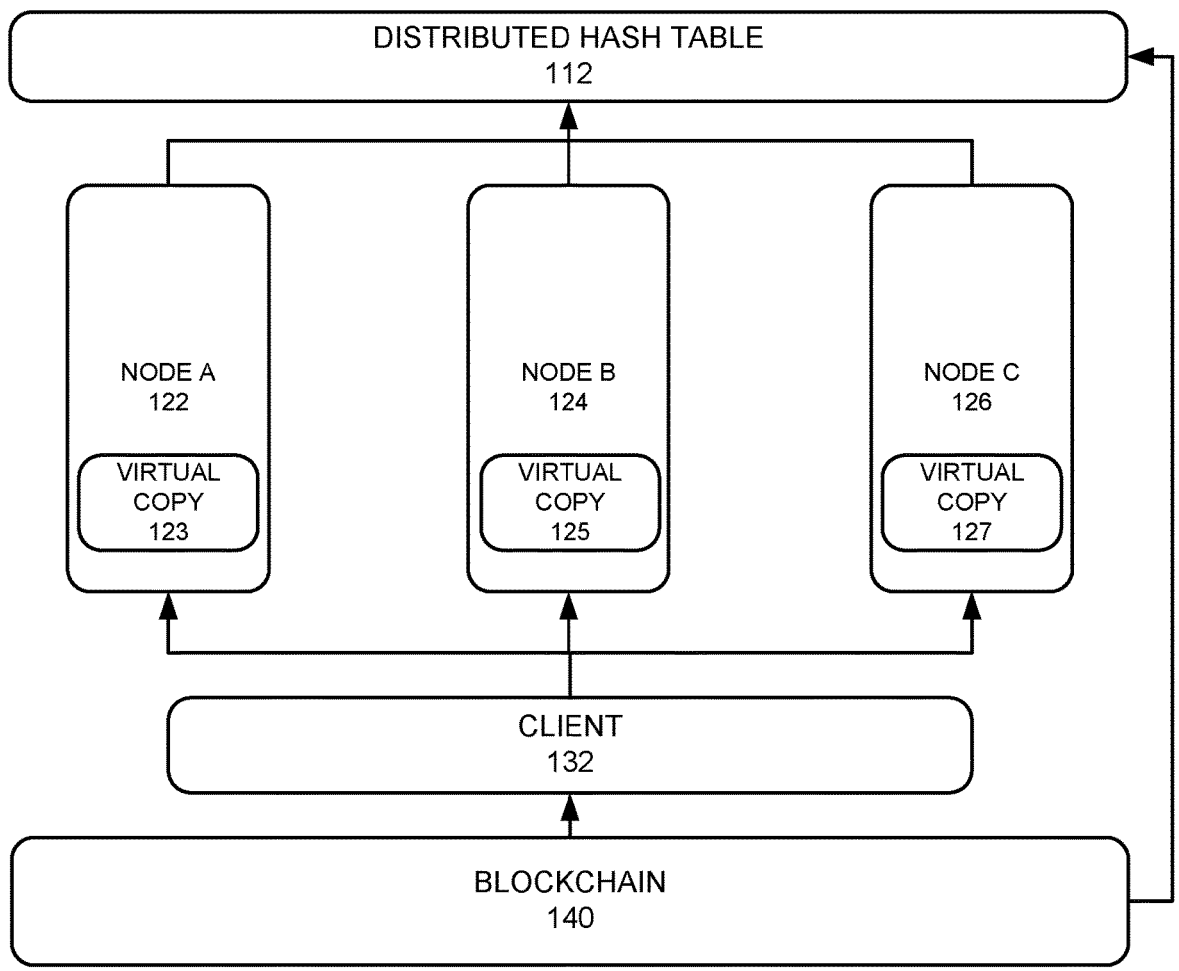
FIG. 1A illustrates a logic block diagram of a distributed blockchain configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which supports an immutable decentralized storage system for a blockchain. Other embodiments provide storing blockchain data in a distributed configuration and using virtual blockchain data to reference the blockchain and conduct transactions.

In one example, nodes may contain a copy of the entire blockchain data, where each block of the blockchain is composed of a series of write transactions. Each write transaction can be represented as a unique piece of data, or an update of a piece of data. For example, by entering an updated version of a file, instead of overwriting an existing data record/file, an update of the existing data may be performed. The blockchain data may be fully distributed and stored within a distributed hash table (DHT) in which key and value pairs are stored in the DHT and any participating node can retrieve a value associated with the key. Nodes can keep track of their longest chain and have access to the chain at any time. In one embodiment, nodes will not have the burden of keeping track of the entire blockchain. They can instead keep a virtual copy (e.g., headers only or a subset of the headers) in memory, while being able to access any block by simply referring to the DHT. This permits the network nodes to synchronize faster with the network, and as nodes join/leave the network, they can exploit the DHT to maintain control. Each node is responsible for a subset of the key space within the DHT as well, and when a node fails or leaves the network, other nodes will be responsible for that area and take over the key space.

The example embodiments provide a blockchain scheme that does not require two separate blockchains; instead, the blockchain is built into the DHT. As a result, the same source that is used to store data, is used to store the blockchain and corresponding metadata. This configuration permits greater throughput on the network and greater availability, while at the same time synchronizes new nodes faster. As a result, the DHT will permit the blockchain to grow dynamically and with minimal to no delays. The DHT configuration provides erasure coding (where data is fragmented and encoded with redundant data pieces and stored in different locations) and lightweight proof-of-work (data which is difficult to produce but easy for certain nodes or individuals to verify and which satisfies certain requirements) to build a high-performance blockchain storage configuration. This type of configuration provides that no single node is required to store the blockchain. The DHT configuration also supports caching for hot blocks, synchronization akin to DHTs, reliability via erasure coding and DHT with multiple mapping functions. Further, data cannot be modified, deleted, or corrupted, is recoverable, and is fully immutable as it is stored in its entirety on the blockchain.

Example embodiments provide a method, apparatus, system non-transitory computer readable medium and computer program product for providing at least one of distributing immutable data across computer nodes, establishing consensus in a network of computer systems, providing end-to-end secure data storage, scaling a block chain through the use of virtualization and peer-to-peer technology, providing availability of data in a trustless peer-to-peer system, and providing data tampering discovery and prevention through the use of hash chains. For example, when a client generates a transaction, a hash of data is created and a private key is used to sign the transaction. The transaction is sent to one of its peer nodes and a node adds the transaction to its memory pool ('mempool'). The node will mine transactions from its mempool and provide a tunable proof-of-work based on randomization and a time since a last block was added, such as based on a stake, etc. The block is then built and a hash header is created and signed. The information is then broadcasted to the network before it is published.

Continuing with the same example, an erasure code may be applied to the entire block and the block may be added to the DHT and not to a local database as a normal blockchain. Each node is part of the DHT network and maintains a subset of blocks. The DHT is distributed across multiple nodes which can keep track of the entire blockchain in a distributed manner. The decentralized immutable storage system is composed of a number of main components. The client, which is responsible for creating a write transaction and sending it to the network nodes and the mining nodes, which build blocks from their mempools. The mempool, which is temporary storage that stores transaction data sent by the client, and the main blockchain distributed hash table, which holds the actual blockchain data striped across the various nodes, collectively store all the blockchain data. By decoupling the blockchain functionality from the storage functionality, any data can be stored into the blockchain, while still being able to scale and provide service level agreement guarantees. A blockchain transaction can then be any size and the data entered onto the blockchain can be considered as a blob of data. This implies that the same blockchain used for storing information from a system (for example, log information from a security system), can be used to store other data (for example, an image or a video), which is normally not permitted.

Each client can transmit a transaction to one or any number of registered nodes. For example, a list of peers may be used to identify the peers that should receive the transaction in order to permit them to view the information as soon as possible. When a node receives a notification of a transaction, if it does not have the transaction or has not seen it, then it will request the transaction. A filter (for example, a bloom filter which is a probabilistic data structure that is used to test whether an elements a member of a set) permits the determination of whether a transaction has been viewed. If it is missing, the transaction data can be requested from the peers that possesses such data. The DHT could be queried for the transaction so it can be mined/verified.

Each node has a mempool. The mempool is stored in memory. The clients may re-transmit their transactions if at some point their transactions are not identified as being received at the network. The proof-of-work is a hybrid scheme that would permit more transactions to be processed. With the DHT, erasure coding can be used along with various combinations of erasure coding and replication to achieve a desired fault tolerance level. For example, to achieve higher than the "five 9s" of reliability, blocks can be split into (m, k) pairs (such as, for example, (72,16) with roughly 1.5× the storage size). Traditional blockchains replicate all data, so they would need larger amounts of storage and would require more network traffic. Example embodiments permit the reduction in the amount of network bandwidth and memory necessary to transfer blocks since chunks of blocks are being transferred as opposed to whole blocks.

Nodes may keep a record of their longest chain which is used to trigger 'garbage collection' (GC). Nodes may need to determine which chains are lost (e.g., when a longer fork is detected). At that point, if a fork has been discarded, a GC operation may be triggered to reduce the amount of storage needed in the DHT. When a node leaves the network, the network application may select the two adjacent nodes with respect to the key space, and requests those nodes take over that load.

DHTs have several built-in GC policies that may be used. For example, timeout based GC may delete data that has not been refreshed/accessed over a predefined time, while, reference count GC requires each piece of data to have a reference counter. When the count drops to '0', it is immediately deleted. In one embodiment, the instant DHT includes a blockchain-driven GC. Further, a reference count-based/time out hybrid scheme, where mining nodes add references to blocks, can be utilized. Similarly, when a longest chain is detected, the current virtual blockchain is discarded. As such, miners can identify all nodes in the discarded blockchain and mark them for deletion to reduce the reference count. A tunable timeout window can be defined based on a detection of whether blocks in the DHT should be deleted or not. If the block is to be deleted (reference count=0) and the timeout window is expired, it will then be removed from the DHT. If a block is part of a node's longest chain, it will remain as part of the DHT, however, the network may discard forks within a certain period of time (for example, 24 hours). The timeout may enable nodes to leave the network resulting in a drop of the block's reference count. In order to provide the nodes a chance to come back and re-join the network, they may be assigned a certain period of time. Otherwise the longest chains may be removed from the DHT.

The client can be a network device, the miner device can be a device with mining capability and the DHT can be stored in a device in a network. Each miner can have a subset of the blockchain. When a miner joins the network, they will share part of the key space. In operation, the DHT does not permit nodes to randomly delete blocks implicitly, instead, they must meet one or more of the following criteria: 1) when they delete a block, the reference count is reduced by 1, 2) when there exists only a single block reference (reference count=1), then the node who owns the block is queried to see if the block is no longer needed and if that is the case, the block must be able to prove it owns the block via the use of cryptographic signatures, and 3) if the node that mined a candidate block for deletion is no longer part of the network, the time-window (for example, a 24-hour rule) will be enacted, which dictates that time-window, if the owner and or device does not re-join the network, the block will be discarded. In one example embodiment, a method of operation may trigger a garbage collection utilizing the GC upon adoption of a new longest chain in order to reduce space overhead due to branching, which is based on the needs within or related to the blockchain.

One example of a sequence for writing transactions may include a client adding a new transaction to the network, a miner receiving a transaction and adding it to a mempool and broadcasting the transaction to its peers. The miner may validate the transaction and check its virtual blockchain information for a block ID needed to validate the transaction. The miner checks its in-memory cache of full blocks. If the full block is not in memory, it will request a full block from the DHT. The DHT may return a block for a block ID to the miner. As a result, the miner will complete the transaction validation and add it to its current block. If a proof-of-work/consensus is reached, the block is created. A newly created block is added to the DHT, which stripes and broadcasts blocks to its peers. A miner may broadcast new block metadata to its peers and each peer miner will then request the new block from the DHT. A miner can remove a transaction from its mempool accordingly.

FIG. 1A illustrates a logic diagram of a distributed blockchain configuration according to example embodiments. Referring to FIG. 1A, the network 100 includes various nodes A 122, B 124 and C 126 which may be updated by a client device/application 132 each time a transaction is added to the blockchain 140. A distributed hash table (DHT) 112, may represent the entire blockchain data. The nodes may receive a virtual copy of the blockchain 123, 125 and 127 which may consist of header information or identification information necessary to reference the blockchain blocks included in the hash table 112.

Nodes 122, 124 and 126 will not have the burden of keeping the entire block chain. They can instead keep a virtual copy (e.g., headers only or a subset of the headers) in memory, while being able to access any block by simply accessing the DHT 112. This helps nodes synchronize faster with the network, as nodes join/leave the network. Each node is responsible for a subset of the key space within the DHT 112 as well, and when a node fails or leaves the network, other nodes will be responsible and take over the key space.

Figure 1B:
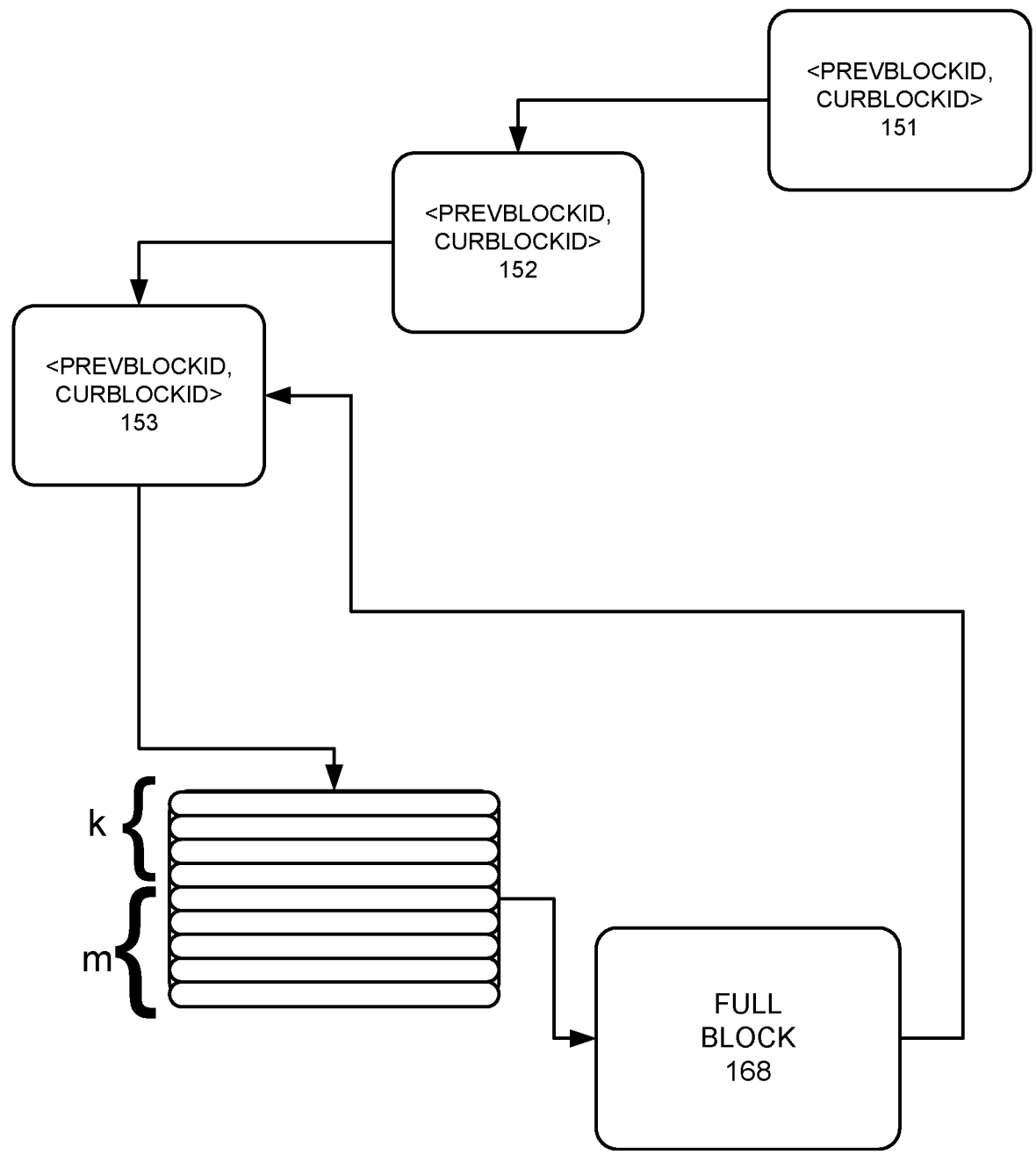
FIG. 1B illustrates a logic block diagram of a verification blockchain configuration according to example embodiments.

FIG. 1B illustrates a logic block diagram of a verification blockchain configuration according to example embodiments. Referring to FIG. 1B, the diagram 150 illustrates various mining nodes each having a history of its longest chain (for example, with headers only). If a node needs to verify any block, it will request it from the DHT (each miner has a DHT client). The blockchain itself will be stored in the DHT. The headers may store the hash of the current block and previous block, and use the block hashes as keys into the DHT. For example, the blocks or block headers 151, 152 and 153 illustrate the current block ID (curblockID) and a previous block ID (prevblockID) of the last block in succession. The key may be retrieved as the previous block ID is retrieved from the full block 168 as needed from the DHT.

Figure 2:
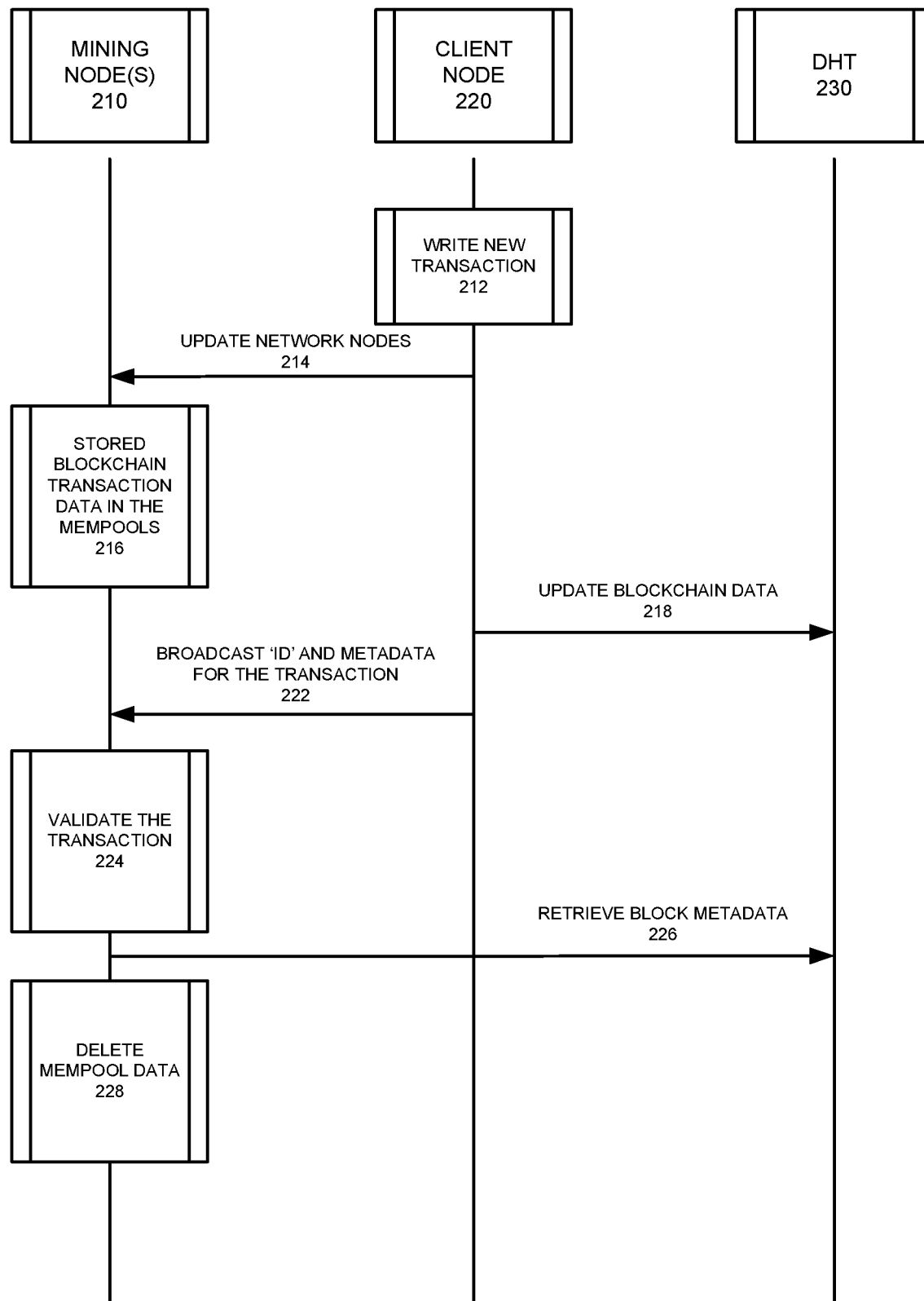
FIG. 2 illustrates a system signaling diagram of a distributed blockchain configuration according to example embodiments.

FIG. 2 illustrates a system diagram 200 of various components included in the distributed blockchain configuration according to example embodiments. Referring to FIG. 2, the client node 220 may initiate a new transaction 212 to be written on the blockchain and the new transaction may be forwarded 214 to each of a plurality of mining nodes 210 to be stored in a mempool 216 so the mining nodes 210 can complete the blocks when necessary. The DHT 230 may be updated to include all blockchain related data 218. However, the mining nodes 210 may only receive virtual blockchain data, such as a broadcasted ID or other metadata 222 which can be used to validate the transaction 224 by referencing portions of the blockchain stored in the DHT 230. The block data can be retrieved 226 and the memory can be deleted once the transaction is validated and any blocks are written 228.

In one example, the client device/application may create the initial blockchain transaction and send it to the mempool. The mempool transaction may include data being added to the blockchain, as well as a hash of the data, and the signature. The client can generate a client-specific unique ID for the particular data and this ID will be used to retrieve the data at a later time. The mempool is a distributed storage subsystem which includes a series of storage pools that uses each client transaction. The data is sent to the DHT nodes and tagged as a mempool transaction, which indicates it is kept in the same DHT as the regular blockchain. However, in one embodiment, mempool DHT data is deleted after the transaction has been mined. When a transaction is built, the client sends the data to the DHT and broadcasts the unique ID for the transaction along with the necessary metadata (e.g., shards' unique IDs) needed by the mining nodes to validate the transaction. Mempool data is deleted once the transaction has been confirmed by several blocks, which is similar to certain cryptocurrency confirmations (such as BITCOIN confirmations). A miner can build blocks from transactions in the blockchain. When a miner takes a transaction from the mempools, the data is reconstructed and validated by verifying the hash matches the data. Once this is done, the miner will apply the same or a different erasure code and split the data into its respective shards. The miner can perform this action for transactions as part of its proof-of-work. Note that each node will only be permitted to mine nodes for a specified period of time, which offers other nodes participating on the network time to mine as well.

Each node can be rewarded for diversity, where diversity is identified based on the number of nodes to which it has successfully transferred valid blocks. This will motivate participating nodes to vary their communication sources as much as possible. When a miner is ready to publish a block, it will then proceed to solve its proof-of-stake or proof-of-work. Its proof-of-stake or work is based on the node's coin age (i.e., time since the node last added a block to the blockchain). The node's contribution to the blockchain may be a number of nodes added, which translates to the amount of work, the total size of the data added to the network, and the node's diversity. Also, a random or valid nonce (a number that may only be used once) may be used. The block will then bid with other nodes and see who has the largest stake on the blockchain. If the node is deemed to have the largest stake, it will be allowed to add its block to the blockchain. When a miner gets a block from another node, it will receive it in the form of block metadata. This block metadata is then used to fetch the block's different pieces from the DHT.

Once the necessary blocks are obtained, the miner can reconstruct the block and verify the block's signature using the original miner's public key, check the MD5 hash of each of the block's transactions, and validate the proof-of-work. The original miner's age can be calculated by tracing back the blockchain from its current point. If the age is different from the age announced by the block (e.g., last published block does not match), then the block can be rejected. Moreover, the block's diversity can be challenged, and the miner can request the mining node for proof in the form of signed responses from peers it has communicated valid blocks with and without repetition. For example, a number can be selected and the mining node can be requested to send signed messages from nodes who have rewarded it with coins. The mining node will respond with one or more messages. The validator will then verify the signatures using the nodes' public keys. Blocks cab be validated by a tunable range of blocks where the values are tunable. The value can be set in place so that the network is not flooded. Once the miner has validated the block, if the block height is greater than the current block height it is processing, the block will switch over to the newly created block. A signed message can be sent to the miner stating it has validated the block, thus rewarding it with coins, which can be based on the reward for mining blocks. The miner can receive a verification message(s) from the various nodes on which it has published its block. Each message will add coins to the block's balance, where the balance is a sum of all the blocks it has mined times the size of each block times the number of confirmations per block.

The DHT may serve as the main storage point. Each node in the network can keep track of its longest chain headers, while the data will reside in the DHT. Whenever a node needs to validate a block or a transaction, it can poll the DHT for the necessary blocks. The DHT can use various types of mappings (such as a KADMELIA or CHORD type of mapping) with uni-directional addressing and convergence to the correct item. Also, hot data can be cached across the DHT and the same DHT that is used to store data can be used to store the blockchain and its metadata. This permits scaling, high throughput, and high availability, while at the same time making synchronization of new nodes faster. As such, the DHT will permit the growth of the blockchain on demand. Such a configuration permits nodes in the network to mine blocks and be rewarded for mining valid blocks, while at the same time, making the blockchain secure since even if individuals were to gain access to a node, they could not flood the network with invalid blocks. In order to secure this configuration, a hybrid of proof-of-work and proof-of-stake can used. The proof-of-work will require miners to validate data being ingested into the network, erasure code it, and store it in the DHT. Moreover, a puzzle could required to be solved prior to publishing a block. The puzzle may be simple but effective. A node can then find a valid nonce so that when the time comes, it can bid to get its block accepted by the other miners.

Certain features of the DHT may include an orphaned blockchain-based garbage collection, for instance, with nodes publishing their blockchains and the DHT refreshing nodes with data that is not refreshed and evicted after predefined timeout from a current time. There can be multiple nodes referencing the same storage unit. The DHT keeps reference in a key/value pair and if a reference is removed from the pair count the DHT will be decremented which will remove orphaned chains (blocks) by counting the reference of the blocks.

Figure 3:
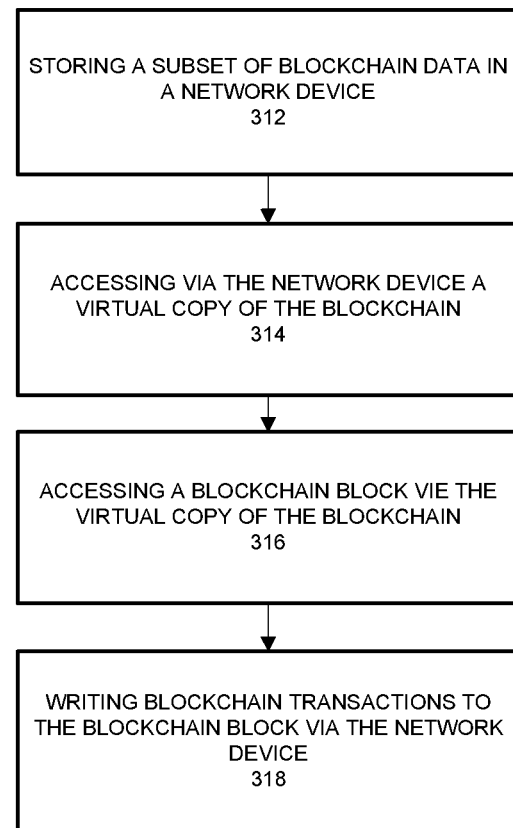
FIG. 3 illustrates a flow diagram of an example method of operation according to example embodiments.

FIG. 3 illustrates an example flow diagram 300 of an example method of operation according to example embodiments. Referring to FIG. 3, the method comprises one or more of storing a subset of blockchain data in a network device 312, accessing via the network device a virtual copy of a blockchain 314, accessing a blockchain block via the virtual copy of the blockchain 316, and writing blockchain transactions to the blockchain block via the network device 318. Additionally, the subset of the blockchain data may include header information corresponding to blocks of the blockchain. The method may also comprise one or more of storing the virtual copy of the blockchain in a distributed hash table accessible by the network device and the network device may be assigned to a subset of a key space of the distributed hash table. The network device may include a plurality of network devices each assigned to a unique subset of an individual key space of the distributed hash table. The method may also include identifying the one or more of the network devices has failed or is inaccessible, and reassigning the unique subset of the individual key space previously assigned to the failed or inaccessible one or more network devices to a new network device. The method may also provide polling, via the network device, the distributed hash table to identify one or more blocks, and validating a transaction stored in the one or more blocks.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
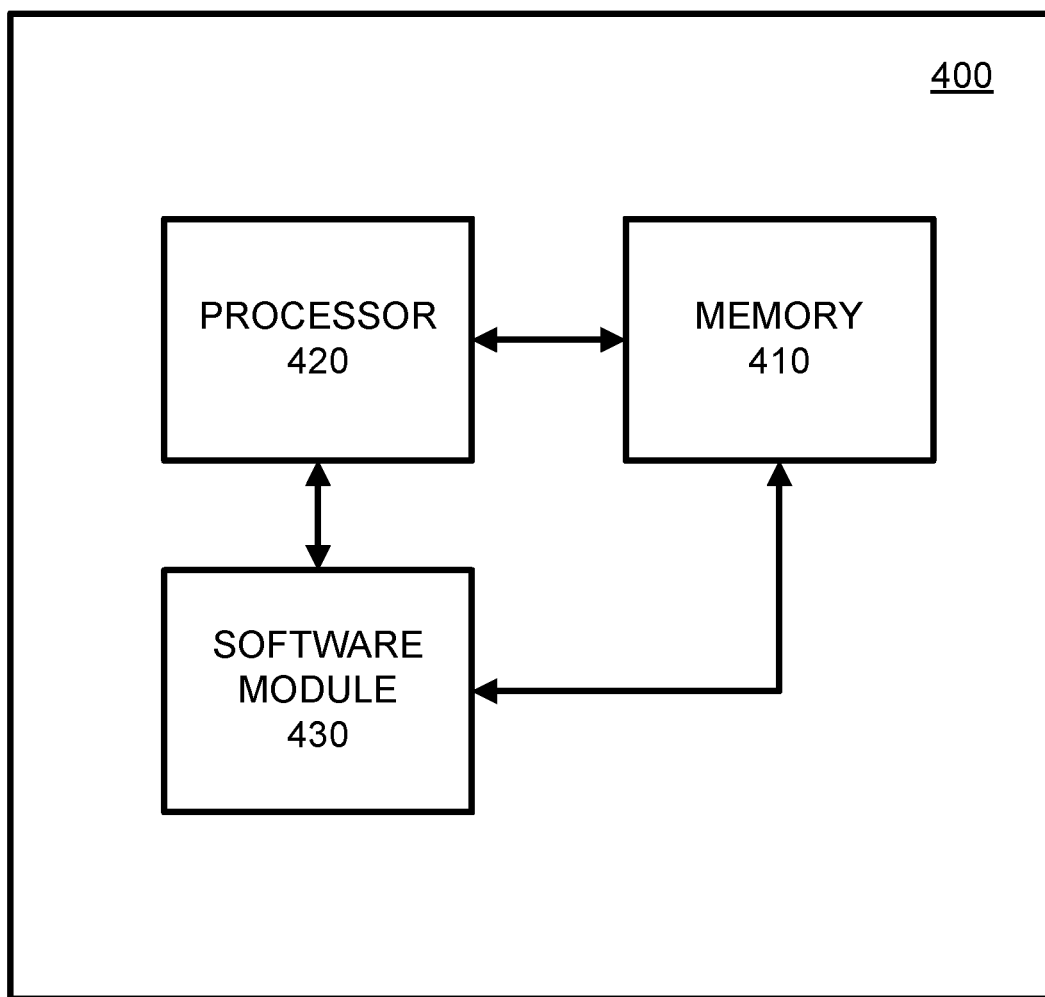
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   storing, by a distributed hash table, blockchain data using a virtual copy of a blockchain stored on a network node, wherein the virtual copy of the blockchain is for access by a network device assigned to a unique subset of an individual key space of the distributed hash table;
   initiating, by the distributed hash table, a garbage collection operation in accordance with a garbage collection policy of the distributed hash table in response to the network node storing a record of a longest blockchain of the network node;
   and
   reassigning, via the distributed hash table, the unique subset of the individual key space previously assigned to failed or inaccessible network devices to another network device.

2. The method of claim 1, wherein the blockchain data comprises:
   header information identifying blocks of the blockchain.

3. The method of claim 1, further comprising:
   receiving, by the distributed hash table, an assignment of a plurality of network devices, each assigned to a unique subset of an individual key space of the distributed hash table.

4. The method of claim 1, further comprising:
   identifying, via the distributed hash table, that the network device has failed or is inaccessible.

5. The method of claim 1, further comprising:
   receiving, by the distributed hash table, a request from the network device to identify one or more blocks.

6. The method of claim 5, further comprising:
   validating a transaction stored in the one or more blocks.

7. An apparatus in a network, the apparatus comprising:
   a memory storing one or more instructions; and
   a processor that when executing the he one or more instructions is configured to:

cause a distributed hash table to store blockchain data using a virtual copy of a blockchain stored on a network node, wherein the virtual copy of the blockchain is for access by a network device assigned to a unique subset of an individual key space of the distributed hash table, cause the distributed hash table to initiate a garbage collection operation in accordance with a garbage collection policy of the distributed hash table in response to the network node storing record of a longest blockchain of the network node, and cause the distributed hash table to reassign the unique subset of the individual key space previously assigned to failed or inaccessible network devices to another network device.

8. The apparatus of claim 7, wherein the blockchain data comprises:

header information identifying blocks of the blockchain.

9. The apparatus of claim 7, wherein the processor is further configured to:

cause the distributed hash table to receive an assignment of a plurality of network devices, each assigned to a unique subset of an individual key space of the distributed hash table.

10. The apparatus of claim 7, wherein the processor is further configured to:

cause the distributed hash table to identify that the network device has failed or is inaccessible.

11. The apparatus of claim 7, wherein the processor is further configured to:

cause the distributed hash table to receive a request from the network device to identify one or more blocks.

12. The apparatus of claim 11, wherein the processor is further configured to:

validate a transaction stored in the one or more blocks.

13. A non-transitory computer readable storage medium configured to store at least one instruction that when executed by a processor of a device implementing a distributed hash table in a network causes the processor to perform:

storing, by the distributed hash table, blockchain data using a virtual copy of a blockchain stored on a network node, wherein the virtual copy of the blockchain is for access by a network device assigned to a unique subset of an individual key space of the distributed hash table;

initiating, by the distributed hash table, a garbage collection operation in accordance with a garbage collection policy of the distributed hash table in response to the network node storing a record of a longest blockchain of the network node; and reassigning, via the distributed hash table, the unique subset of the individual key space previously assigned to failed or inaccessible network devices to another network device.

14. The non-transitory computer readable storage medium of claim 13, wherein the blockchain data comprises:

header information identifying blocks of the blockchain.

15. The non-transitory computer readable storage medium of claim 13, wherein the at least one instruction further causes the processor to perform:

receiving, by the distributed hash table, an assignment of a plurality of network devices to a unique subset of an individual key space of the distributed hash table.

16. The non-transitory computer readable storage medium of claim 13, wherein the at least one instruction further causes the processor to perform:

identifying, via the distributed hash table, that the network device has failed or is inaccessible.

17. The non-transitory computer readable storage medium of claim 13, wherein the at least one instruction further causes the processor to perform:

receiving, by the distributed hash table, a request from the network device to identify one or more blocks.

* * * * *